United States Patent [19]

Christiansen et al.

[11] 4,447,130

[45] May 8, 1984

[54] LIGHT-WEIGHT MIRROR BLANK FOR ASTRONOMICAL PURPOSES AND METHOD OF MAKING A SUPPORTING FRAMEWORK FOR SUCH BLANKS

[75] Inventors: Uwe Christiansen, Gelnhausen; Karlheinz Rau, Hanau; Anton Steinkohl, Gründau; Bruno Streb, Freigericht, all of Fed. Rep. of Germany

[73] Assignee: Heraeus Quarzschmelze GmbH, Hanau, Fed. Rep. of Germany

[21] Appl. No.: 366,254

[22] Filed: Apr. 7, 1982

[30] Foreign Application Priority Data

Apr. 24, 1981 [DE] Fed. Rep. of Germany ....... 3116357

[51] Int. Cl.³ .......................... B32B 3/12; G02B 5/08
[52] U.S. Cl. ...................................... 350/310; 52/806;
428/116; 428/912.2
[58] Field of Search ............................ 428/116, 912.2;
350/288, 310, 320; 52/608

[56] References Cited

U.S. PATENT DOCUMENTS

| 1,888,341 | 11/1932 | Winckler | 428/912.2 X |
| 2,988,959 | 6/1961 | Pelkey et al. | 428/116 |
| 3,728,186 | 4/1973 | Mohn | 428/912.2 X |
| 3,754,812 | 8/1973 | Mohn | 428/116 |
| 4,331,383 | 5/1982 | Christiansen | 350/310 |

FOREIGN PATENT DOCUMENTS

| 968025 | 8/1964 | United Kingdom | 428/116 |
| 2077938 | 12/1981 | United Kingdom | 350/310 |

Primary Examiner—Henry F. Epstein
Attorney, Agent, or Firm—Sprung, Horn, Kramer & Woods

[57] ABSTRACT

A light-weight mirror for astronomical purposes is disclosed. The mirror consists of a mirror plate, a back plate and a supporting framework disposed between them and consisting of a plurality of rows of tubes. The rows of tubes are staggered one from the other. Each tube in a row has a line or strip of contact with two adjacently disposed tubes of the next row. The tubes are welded together along the contact line or strip. The thickness of the tube wall is reduced in the area of the contact line or strip.

7 Claims, 7 Drawing Figures

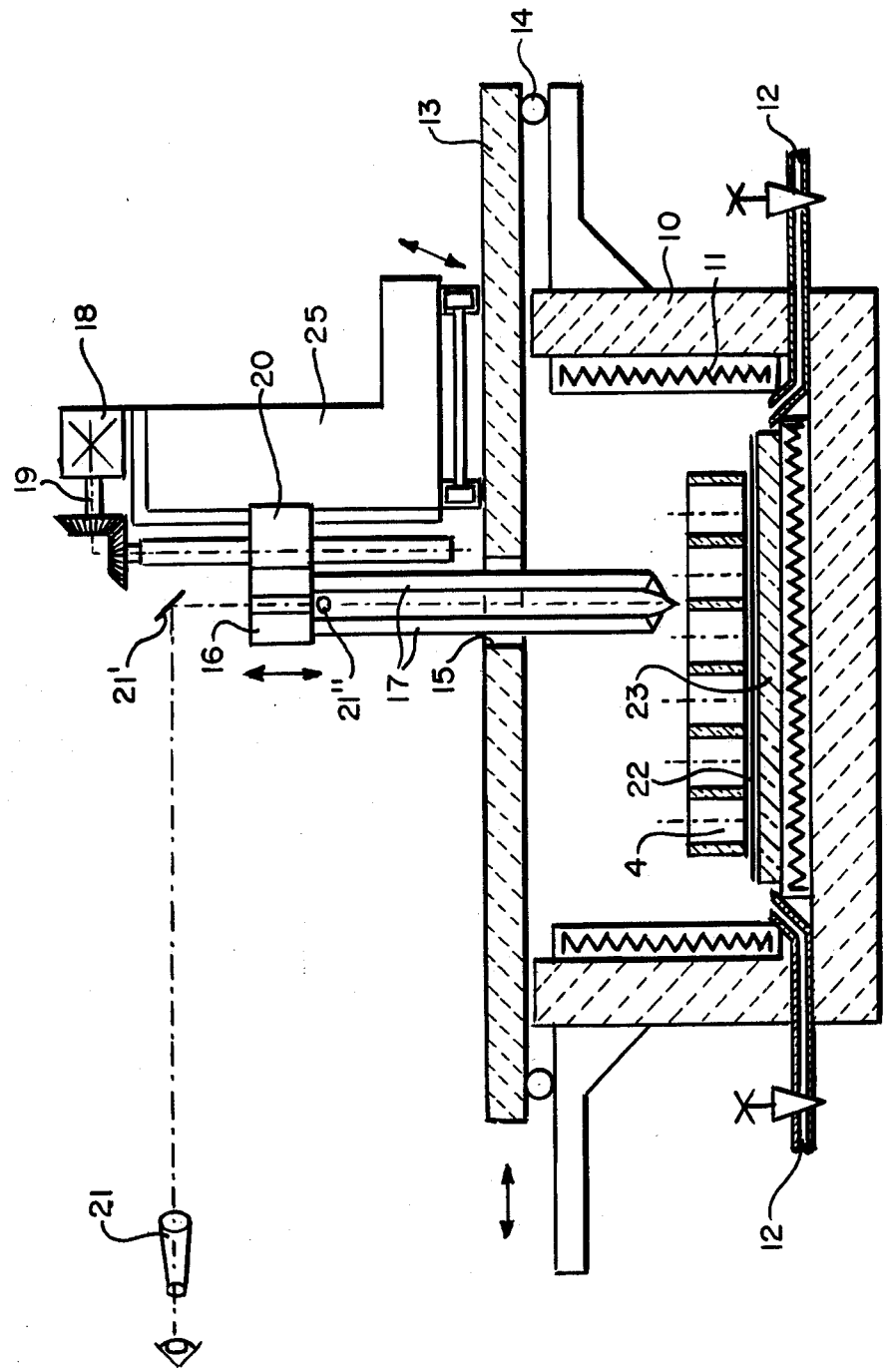

LIGHT-WEIGHT MIRROR BLANK FOR ASTRONOMICAL PURPOSES AND METHOD OF MAKING A SUPPORTING FRAMEWORK FOR SUCH BLANKS

BACKGROUND OF THE INVENTION

1. Field of the Invention

This invention relates to a light-weight mirror blank for astronomical purposes, having a mirror plate of transparent vitreous silica or high-silica glass, a back plate of transparent vitreous silica, opaque vitreous silica or high silica glass and a supporting framework disposed between the mirror plate and the back plate and made of transparent vitreous silica, opaque vitreous silica or high-silica glass and consisting of a plurality of rows of tubes, the rows of tubes being in a staggered relationship to one another and the individual tubes being permanently joined to the mirror plate and back plate, the tube axes being parallel to one another and to the mirror axis. This invention further relates to a method of making a supporting framework for mirrors of the kind specified above.

2. Discussion Of Prior Art

U.S. Pat. No. 1,888,341 discloses a light-weight mirror blank for astronomical purposes, which has a supporting framework comprising a plurality of rows of tubes, the rows of tubes being in a staggered relationship to one another (FIG. 5). The tubes consist of transparent vitreous silica. The tube axes are parallel to one another and perpendicular to the mirror axis. The tubes are joined to one another at their junctions.

A light-weight mirror blank for astronomical purposes is known from U.S. Pat. No. 2,988,959, which has a mirror plate and a back plate between which a supporting framework of a plurality of rows of tubes is disposed, the tube rows being in a staggered relationship to one another. The tube axes are parallel to one another and parallel to the mirror axis. Glass is used as the material for this light-weight mirror blank. The individual tubes are permanently joined to the mirror plate and the back plate by means of a cement. The tubes can have a circular or rectangular or triangular cross section.

Lastly, another light-weight mirror blank for astronomical purposes is known from British Pat. No. 968,025, which has a mirror plate and a back plate as well as a supporting framework permanently joined to the two plates and made of tubes of hexagonal cross section assembled in honeycomb form. Transparent vitreous silica, opaque vitreous silica or a glass of high silica content is used as the material for the light-weight mirror blanks described therein.

In the known light-weight mirror blanks, either the supporting framework weight is very low while having at the same time a low transverse stability, or, if the transverse stability is high, the weight reduction of the supporting framework is only imperfect.

SUMMARY OF THE INVENTION

Accordingly, it is the object of the invention to provide a light-weight mirror blank of the kind described in the beginning, which is characterized by a weight reduction of the supporting framework such that the weight can amount to only 8% of that of a corresponding solid body, while at the same time the mirror blank has a high transverse stability and stiffness.

This object is accomplished by the invention in a light-weight mirror blank of the kind described above by staggering the rows of tubes such that each tube in a row has a line or strip of contact with two adjacent tubes of a neighboring row, that the wall thickness of the tubes in the area of the contact line or strip is reduced in comparison with the rest of the wall thickness of the tube, and the tubes are welded together along the contact line or strip.

When reference is made herein to a high-silica glass, this term is to be understood to mean a vitreous material whose silica content amounts to a least 90% by weight.

It has been found practical to reduce the wall thickness of the tubes in the area of the contact lines or strips by ten to fifty percent of the thickness of the rest of the tube, the rest of the wall thickness ranging from 0.8 to 5 mm.

For making the supporting framework, tubes of square or rectangular cross section with rounded corners have been found to be particularly desirable, in which the tube wall thickness is reduced in the corner areas. The tubes in this case are advantageously disposed in a checkboard pattern, leaving spaces between individual tubes of each row.

If the supporting framework consists of tubes of circular cross section, the contact strips of reduced wall thickness of each tube are in the form of longitudinal raised ribs. The tubes can have the raised ribs in their original configuration, or the raised ribs can be formed when the supporting framework is welded together.

If tubes of triangular cross section are used, especially in the case of equilateral triangular cross sections, the arrangement of the tubes is such that the tubes of a row are disposed so as to abut one another such that the base lines of the triangular cross sections form a straight line.

The weld along the contact line or strip can be continuous or it can be a spot weld like the spot welding known in conjunction with the joining of metal parts.

The reduction of the wall thickness of the tubes along the contact line or strip has the advantage that it can be brought rapidly to the welding temperature, and the construction of the supporting framework in accordance with the invention does not entail any loss of transverse stability and stiffness in the supporting framework.

BRIEF DESCRIPTION OF DRAWINGS

Additional advantageous features of the invention will be seen in the following description and drawings of advantageous supporting framework designs and of the method of making a supporting framework. Referring to the drawings:

FIG. 7 is a diagrammatic representation in vertical section through an apparatus for the production of a supporting framework for a light-weight mirror blank.

DESCRIPTION OF SPECIFIC EMBODIMENTS

Figure 1:
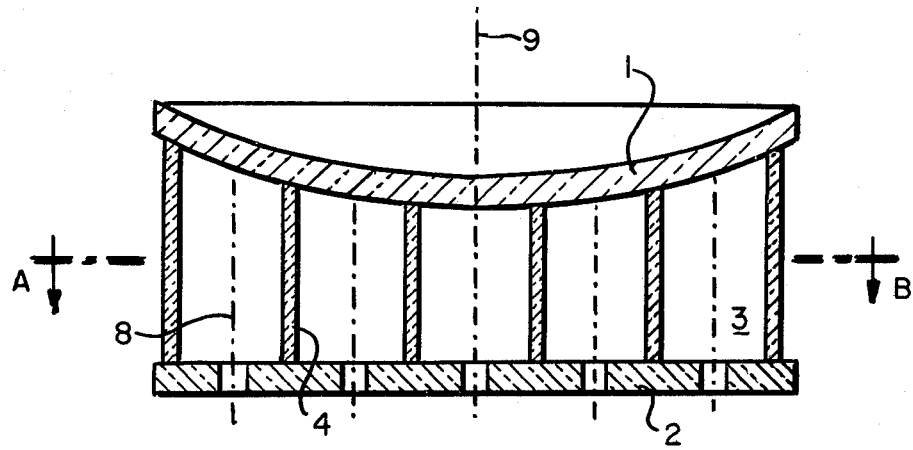
FIG. 1 shows a vertical cross section through a light-weight mirror blank of the invention.

The lightweight mirror blank represented in FIG. 1 consists of the mirror plate 1 and the back plate 2 and of the supporting framework 3, which is formed of the tubes 4. In this embodiment, the mirror plate, the back plate and the tubes of the supporting framework consists of transparent vitreous silica. The tube axes 8 are parallel to one another and parallel to the mirror axis 9.

Figure 2:
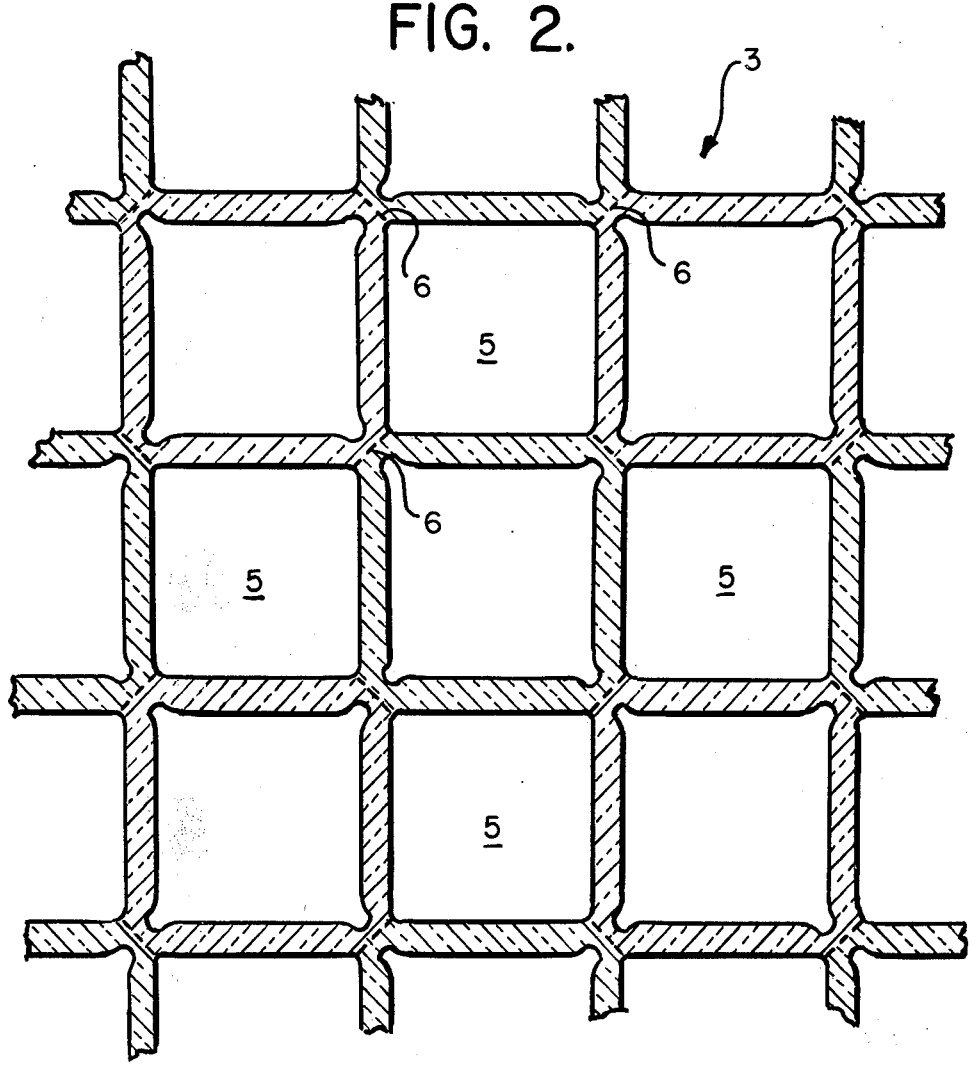
FIG. 2 is a detail view of a horizontal cross section through a supporting framework of a mirror blank which is formed of tubes of square cross section.

In FIG. 2, which represents a detail of a horizontal section through the supporting frame 3 in the plane A-B of FIG. 1, the supporting framework was made of tubes of square cross section with rounded corners, in which the wall thickness of the tube is reduced in the area of the corners. In the area of the corners, the wall thickness of a tube amounts to 0.5 to 4.5 millimeters. The rest of the wall thickness of the tube, which is not reduced, amounts to 0.8 to 5.0 millimeters. As it can be seen in the figure, the tubes are arranged in a checkerboard pattern leaving a space 5 between the individual tubes of each row. The tubes are welded together at the corners forming a narrow plane of contact 6.

Figure 3:
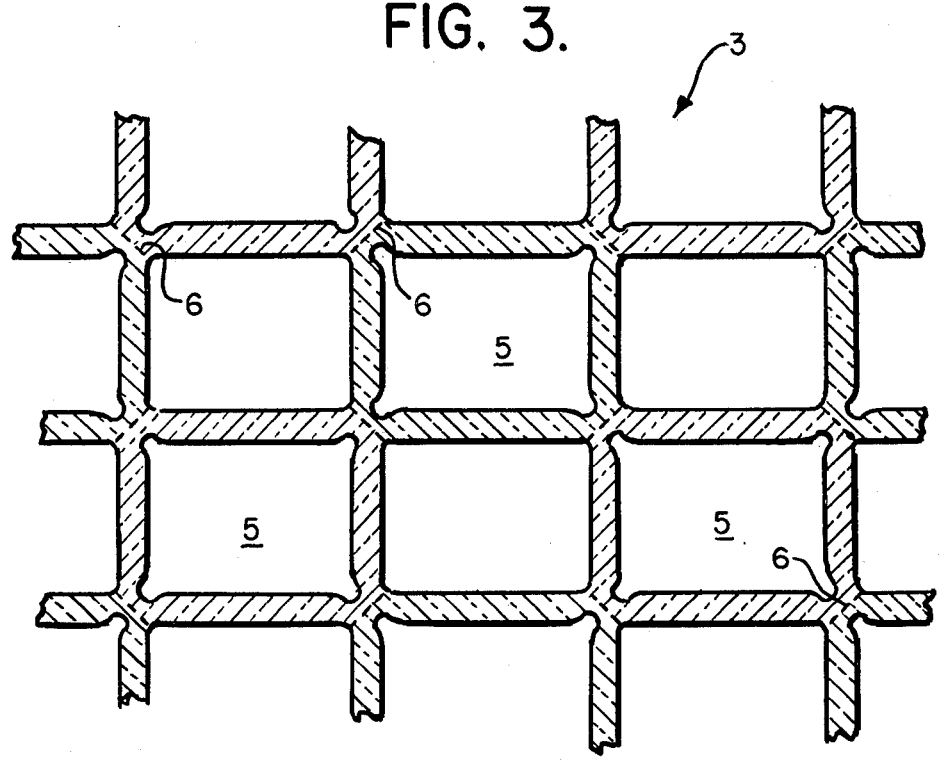
FIG. 3 is a detail of a horizontal section through a supporting framework of a mirror blank, which is formed of tubes of rectangular cross section.

The detail view of a horizontal cross section through a supporting frame represented in FIG. 3 differs from the one represented in FIG. 2 in that the supporting framework consists of tubes of rectangular cross section.

Figure 4:
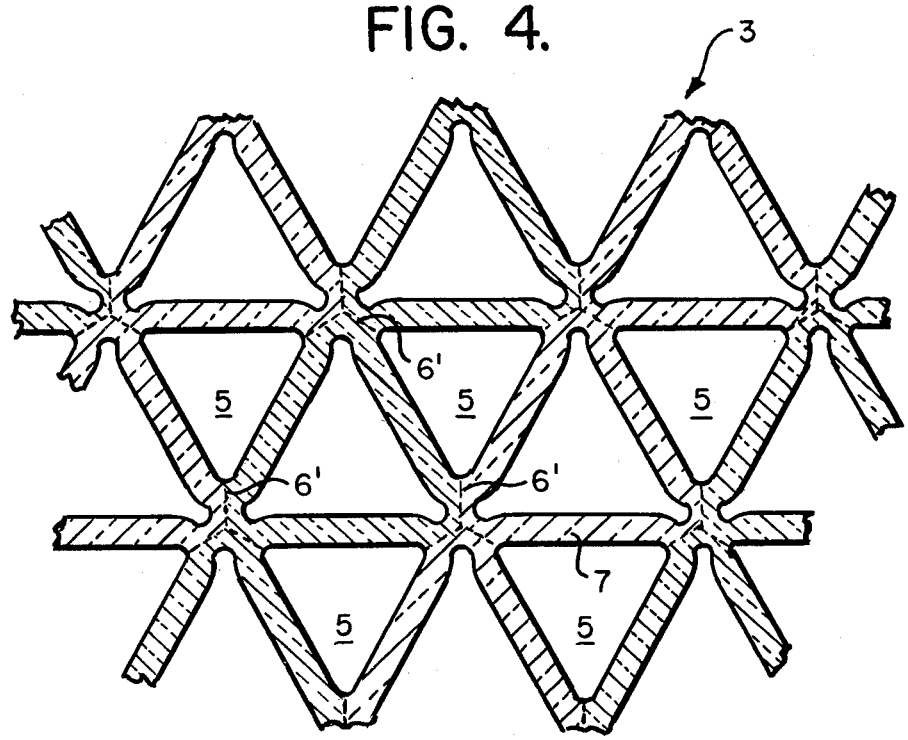
FIG. 4 is a detail of a horizontal section through a supporting framework of a mirror blank, which is formed of tubes of triangular cross section.

The detail view of a horizontal cross section through a supporting framework represented in FIG. 4 is of a design in which tubes of triangular cross section are used, and in particular the side lengths of the triangle are equal. The design is again checkeoboard-like, the tubes of a row being disposed so as to abut one another such that the base lines of the triangle cross sections form a straight line 7. The tubes of triangular cross section are welded together along the line of contact 6'. In this arrangement, too, a space 5 is present, which contributes to the reduction of the weight of the supporting framework, which is also the case with the space 5 represented in FIGS. 2 and 3.

Figure 5:
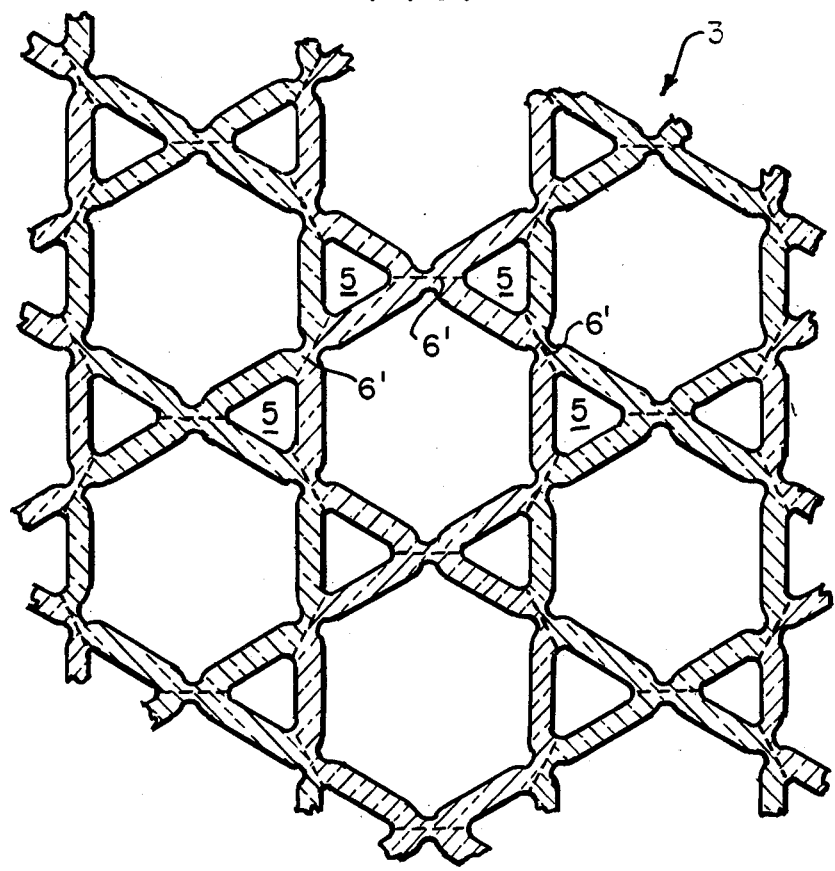
FIG. 5 is a detail of a horizontal section through a supporting framework of a mirror blank, which is formed of tubes of hexagonal cross section.

As it is apparent from the detail given in FIG. 5 of a horizontal section through a supporting framework, tubes of hexagonal cross section are used for the framework, and they are welded together at the contact lines 6', and again, spaces 5 are left between them.

Figure 6:
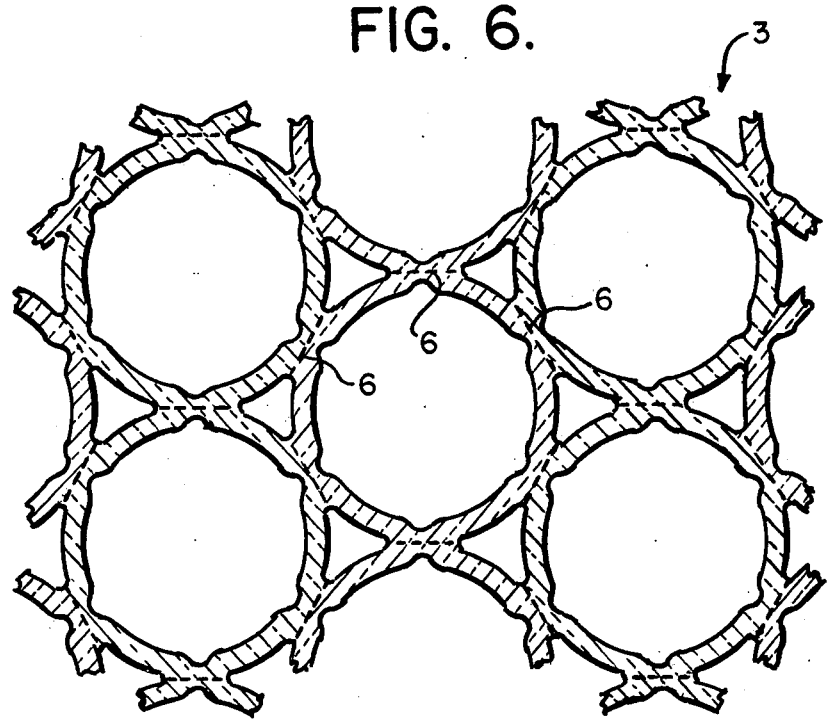
FIG. 6 is a detail of a horizontal section through a supporting framework of a mirror blank, which is formed of tubes of circular cross section.

Finally, FIG. 6 shows another embodiment, in which tubes of circular cross section are used to form the framework. The wall thickness of these tubes is diminished along the contact line or strip 6, and this area of diminished wall thickness is in the form of a raised longitudinal rib. The tubes are welded together along the contact line 6.

In Fig. 7, the diagrammatic representation shows an apparatus for making a supporting frame for a light-weight mirror blank. It comprises the furnace 10 having an electrical resistance heater 11, and is provided with lines 12 for the delivery of inert gas such as nitrogen. The furnace 10 is provided with the removable cover 13, which is movable on rollers 14, for example. The cover has an opening 15 through which a welding device 16 consisting of the two gas torches 17 is lowered into the furnace cavity and can be raised out of it by means of the motor 18 and the raising and lowering apparatus 20 connected to the motor shaft 19. The gas torches 17 are affixed to the raising and lowering apparatus 20, which in turn is mounted on the frame 25 which is disposed so as to be able to travel at right angles on the furnace cover. The precise position of the gas torches 17 within the furnace can be observed through the optical system 21, 21', 21".

The making of a supporting framework for a light-weight mirror blank is accomplished in the following manner:

With the furnace chamber cover retracted, first the tubes 4 are lowered in rows onto a base plate 23 covered with a thin layer of graphite paper 22 and consisting of transparent or opaque vitreous silica, the individual rows of tubes being staggered such that two portions of reduced wall thickness in each tube of a row are in contact with or at a distance of up to 1.5 mm from an area of reduced wall thickness of two adjacently disposed tubes of the neighboring row. Fillers or graphite, vitreous silica or zirconium dioxide are placed in the intermediate spaces 5. Then the furnace 10 is closed with the cover 13 and flooded with an inert gas through the gas feed line 12, the electrical heating is turned on, and the interior of the furnace is heated to a temperature of 800° to 1000° C. As soon as the tubes disposed within the furnace have reached this temperature, the welding apparatus 16 with the two gas torches 17 are lowered into the furnace by means of the motor 18 through the motor shaft 19 and the raising and lowering apparatus 20, this being done in such a manner that only one gas torch enters into one tube.

While maintaining the temperature and the inert gas atmosphere in the furnace, two thinned wall thickness areas of two tubes which are to be joined are heated to the welding temperature, and welded together beginning from the base plate 23 and moving in the direction of the cover 13. The welding together of the tubes takes place along the line of contact of the two tubes, although the flame gases do not directly play upon the line of contact, the flame gases striking only the inner side of the thinned wall section.

After completion of a weld, the cover 13 and/or the frame 25 are shifted over to the next welding position and the welding of two tubes along another line of contact is performed in the same manner as described above. After all tubes have been welded together, the supporting framework thus formed is again heated to the transformation temperature of the supporting framework material and then, after a slow cooling down, the supporting framework is removed from the furnace. The transformation temperature for tubes of transparent vitreous silica ranges from 1050° to 1150° C.

It has proven desirable before beginning the welding of the individual tubes to join them together at their ends facing the cover 13 by spot welding at the thinned portions of their walls. During the subsequent welding together of the tubes along their lines or planes of contact, this prevents them from shifting in relation to one another.

The production of a mirror blank consisting of the mirror plate 1, the back plate 2 and the supporting framework 3 made in accordance with the invention can be peformed in a known manner, for example by fusing the mirror plate and back plate to the supporting framework as described in U.S. Pat. No. 3,728,186 in conjunction with FIG. 7.

What is claimed is:

1. In a light-weight mirror blank for astronomical purposes, having a mirror plate of transparent vitreous silica or high-silica glass, a back plate of transparent or opaque vitreous silica or high-silica glass, a supporting framework of transparent or opaque vitreous silica or high-silica glass, disposed between the mirror plate and the backplate comprising several rows of tubes, the rows of tubes being staggered and the individual tubes being permanently bonded to the mirror plate and the back plate, and the tube axes being parallel to one another and to the mirror axis, the improvement wherein the tube rows are staggered such that each tube of a row has a contact line or contact strip with two adjacent tubes of an adjacent row, the wall thickness of the tubes in the area of contact line or contact strip is reduced with respect to the rest of the thickness of the wall of the tube and the tubes are welded together along the contact line or contact strip.

2. A mirror blank according to claim 1, wherein the wall thickness of the tubes in the area of the contact line or strip is reduced by 10 to 50% with respect to the rest of the wall thickness of the tube, and the rest of the wall tube thickness amounts to 0.8 to 5 mm.

3. A mirror blank according to claim 1, wherein the tubes have a square or rectangular cross section, and the tube wall thickness is reduced in the area of the corners.

4. A mirror blank according to claim 3, wherein said corners are rounded.

5. A mirror blank according to claim 4, wherein said tubes are disposed in a checkerboard pattern leaving an interspace between the individual tubes of a row of tubes.

6. A mirror blank according to claim 1, wherein the tubes have a circular cross section and the areas of each tube that are reduced in their wall thickness are formed as raised ribs.

7. A mirror blank according to claim 1, wherein the tubes have a triangular cross section, and that the tubes of a row are disposed abutting one another such that the base lines of the triangular cross sections form a straight line.

* * * * *